United States Patent
Martin

[11] 3,828,966
[45] Aug. 13, 1974

[54] COLLAPSIBLE BAKING PAN
[76] Inventor: John J. Martin, Lafayette Towers, 10a, Norfolk, Va. 23508
[22] Filed: Nov. 8, 1972
[21] Appl. No.: 304,820

[52] U.S. Cl............................ 220/7, 220/6, 220/65, 220/85
[51] Int. Cl............................................. B65d 7/24
[58] Field of Search........... 220/4, 7, 6, 65, 1 C, 85; 229/30–36, 41, 3.5 MF; 211/126, 130, 132, 178 R, 85

[56] References Cited
UNITED STATES PATENTS

| | | | |
|---|---|---|---|
| 915,565 | 3/1909 | Davison | 220/6 |
| 2,236,992 | 4/1941 | Broadley | 220/65 |
| 2,475,513 | 7/1949 | Peckinpaugh | 220/6 |
| 2,536,281 | 1/1951 | Hamel | 220/6 |
| 3,186,585 | 6/1965 | Denny | 220/6 |
| 3,337,078 | 8/1967 | Radek | 220/6 |
| 3,747,794 | 7/1973 | Bitney | 220/7 |

Primary Examiner—William I. Price
Assistant Examiner—Joseph Man- Fu Moy
Attorney, Agent, or Firm—Krafft & Wells

[57] ABSTRACT

This invention relates to a collapsible baking pan having a disposable liner of aluminum foil. The pan can be collapsed to a substantially flat position for ease of packing.

2 Claims, 4 Drawing Figures

3,828,966

3,828,966

COLLAPSIBLE BAKING PAN

BACKGROUND OF THE INVENTION

1. Field of the Invention

The field of the invention is that of portable, collapsible baking utensils, and more particularly, in portable, collapsible metal baking pans having a removable, disposable liner for use by campers, hikers and the like.

2. Description of the Prior Art

Collapsible baking pans have been known heretofore. It has been the purpose of collapsibility in such pans to provide ease of removal of the baked contents of the pan. Such pans have usually been held in the closed position by means of pins, clips or the like. Such prior art devices are exemplified by U.S. Pat. Nos. 156,470 1,261,566 and 1,714,379.

Disposable baking pans, usually formed of heavy gauge aluminum foil are also known in the prior art. Such pans eliminate the necessity for after use cleaning because of their disposability. While their relative light weight is an advantageous feature, such pans are not collapsible and thus occupy a large amount of space in the pack of a camper or hiker. Such pans are also relatively expensive if disposed of after a single use.

SUMMARY OF THE INVENTION

It is therefore an object of the present invention to provide a baking pan for use by hikers, campers and the like which is collapsible to a relatively flat configuration for ease of transportability.

It is a further object of the invention to provide a baking pan having a readily removable, disposable inner liner to eliminate the necessity for cleaning the pan after use.

These and other objects of the invention are achieved by the unique design of the present invention which comprises a unitary outer structure formed of a lightweight material such as aluminum sheet and a removable inner liner formed of a lightweight, readily deformable material such as aluminum foil. The outer structure of the present invention consists of a base having hinged thereto a plurality of side sections. Support members are also hinged to the base to support the side members in closed position when desired. The removable inner liner is retained in position within the outer structure by the clamping action between the base member and the side members when the pan is in the closed position. Positioning and retaining means are provided on the outer surface of the side portions to coact with the support members to cause them to be held in the supporting position when desired. These positioning and retaining means preferably take the form of outwardly extending dimples, one pair of each on each side position. When it is desired to support the side portions in closed position, the support members are positioned between the dimples which serve to retain the support members in position. When it is desired to remove the baked item from the pan, the support members are manually rotated to their depressed position and the side members are swung into their open position. The foil is thus freed from the clamping action of the side portions and the base portion and the baked item can be removed from the collapsed pan. It will be noted that under proper use the baked item has not come into direct contact with the outer structure and thus there is no necessity for cleaning the outer unit. The outer unit can then, after cooling, be easily packed for transfer affording a benefit to campers, hikers and the like who often find themselves without suitable facilities for after meal cleaning.

BRIEF DESCRIPTION OF THE DRAWINGS

The invention will be more readily understood by reference to the accompanying drawings in which.

DESCRIPTION OF THE PREFERRED EMBODIMENT

Figure 1:
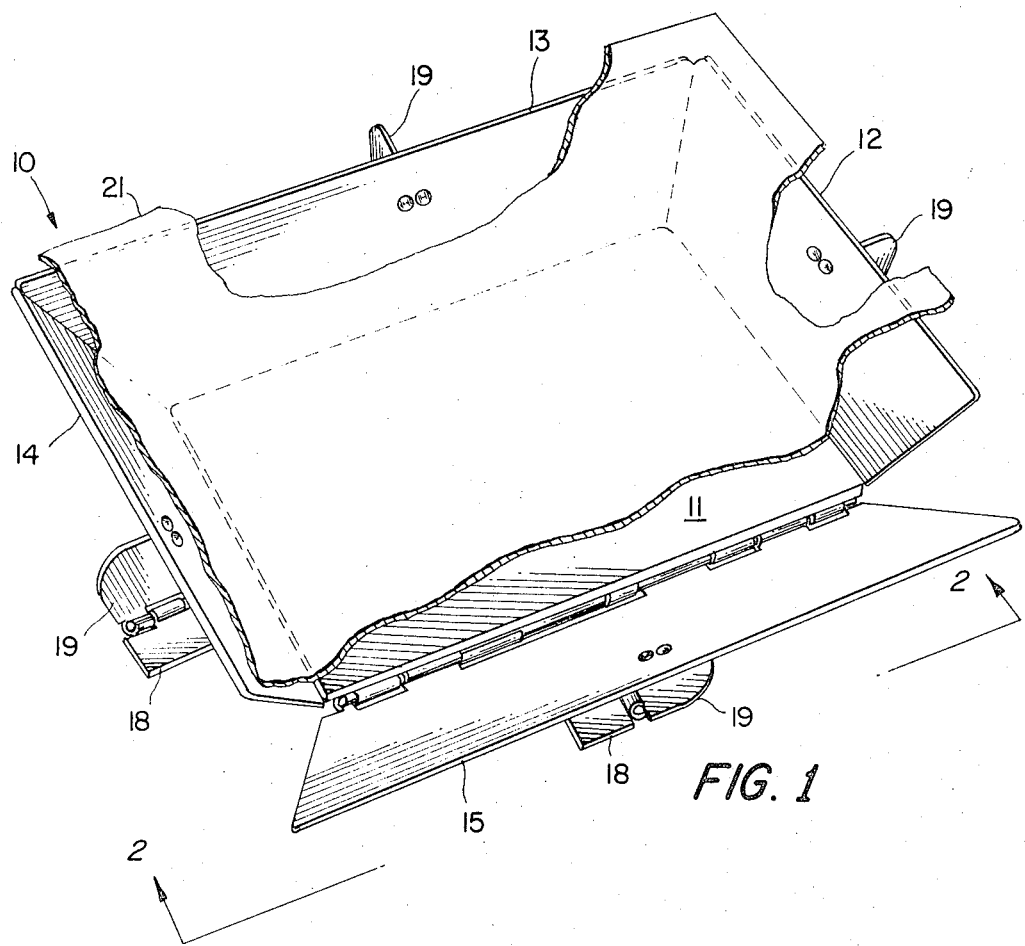
FIG. 1 is a perspective view of the invention showing one side portion in partly open position
Figure 2:
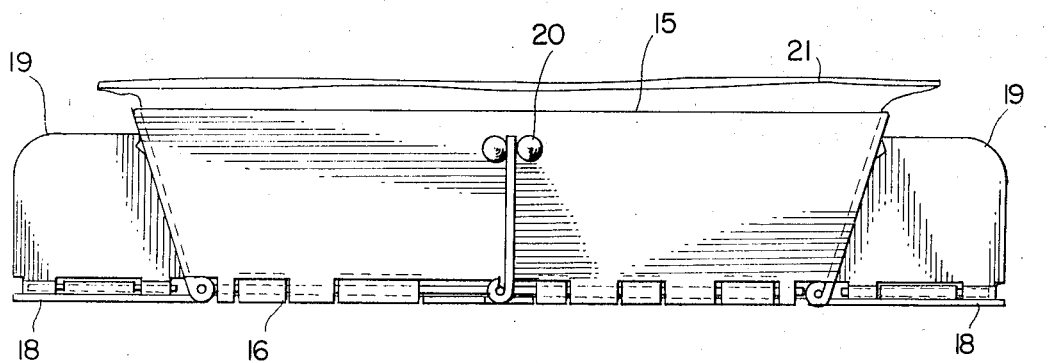
FIG. 2 is a side view of the device of FIG. 1, taken along the lines A—A.
Figure 3:
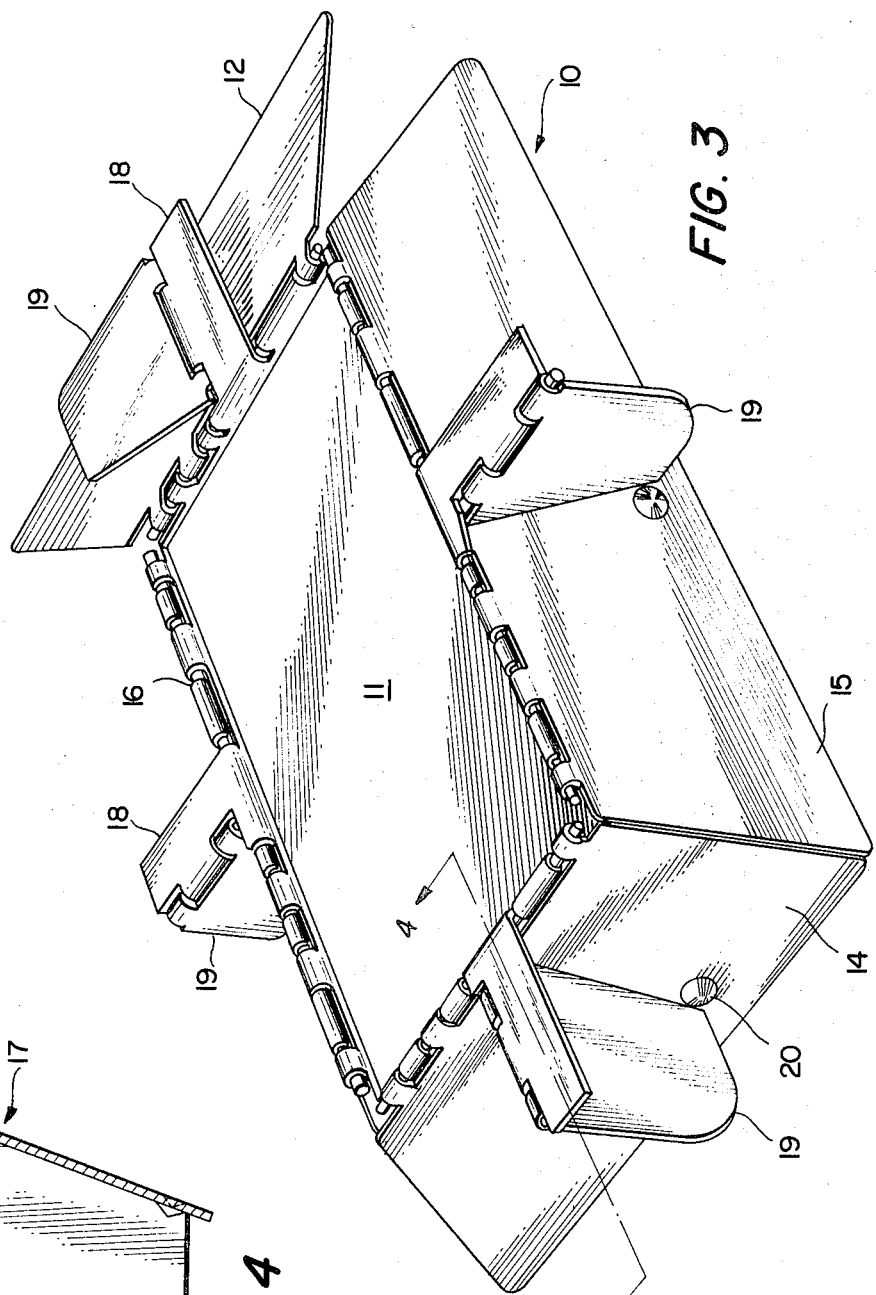
FIG. 3 is a bottom view in perspective of the invention.
Figure 4:
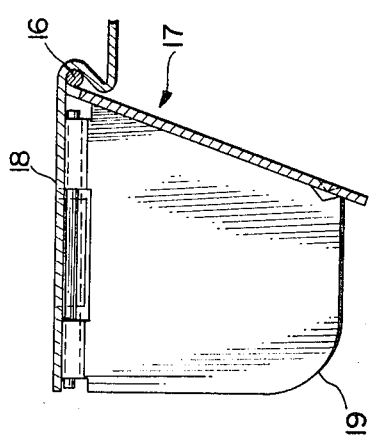
FIG. 4 is a partial side view of a supporting member taken along the lines B—B of FIG. 3.

Referring to the drawings, the baking pan 10 of the invention comprises a base 11 and four sides 12, 13, 14, 15. The sides 12, 13, 14, 15 are connected to the base 11 by hinge means 16. Also connected to the respective sides 12, 13, 14, 15 and the base 11 by hinge means 16 are support means 17. Each support means 17 includes a laterally extending member 18 having hinged thereto an upstanding member 19. When the respective sides 12, 13, 14, 15 are in the closed position, an upstanding member 19 holds each side in place. Dimples 20 on each side retain the upstanding member in position.

In accordance with the present invention, a sheet of aluminum foil 21 is placed over the base 11 of the pan 10 when it is in open position. The sides 12, 13, 14, 15 are then moved to closed position and retained in such position by the support means 17. The sheet of aluminum foil 21 is retained in position by the wedging action between the base 11 and the sides 12, 13, 14, 15 when the sides are in their closed position.

After use the baking pan 10 is easily collapsed to permit ready removal of the baked item and the aluminum foil 21. Thus, there is no necessity to wash the pan 10, and it collapses to a substantially flat surface for ease of packing.

It is thus apparent that the present invention provides a baking pan which is light in weight, collapsible to a substantially flat surface and does not require washing after use.

I claim:

1. A collapsible baking pan comprising, in combination, a bottom surface, said bottom surface having appended thereto by hinge means a plurality of side members, said side members being movable between an open and a closed position, said side members when in said closed position being retained in position by supporting means, said supporting means being connected to said bottom by hinge means, and an inner liner of aluminum foil, said inner liner being retained in position when said sides are in the closed position by the wedging action between said bottom and said sides.

2. The baking pan of claim 1, including dimple means on each side member to retain said supporting means in position when said side members are in closed position.

* * * * *